US012304772B2

(12) United States Patent
Lagadec et al.

(10) Patent No.: US 12,304,772 B2
(45) Date of Patent: May 20, 2025

(54) TRANSFER DEVICE FOR MAINTAINING AN ELECTRICAL OR OPTICAL CONNECTION

(71) Applicant: THALES, Courbevoie (FR)

(72) Inventors: Jean Lagadec, Elancourt (FR); François Cadalen, Brest (FR); Marc Doukhan, Elancourt (FR); Steve Bendelac, Brest (FR)

(73) Assignee: THALES, Courbevoie (FR)

( * ) Notice: Subject to any disclaimer, the term of this patent is extended or adjusted under 35 U.S.C. 154(b) by 993 days.

(21) Appl. No.: 17/297,444

(22) PCT Filed: Dec. 3, 2019

(86) PCT No.: PCT/EP2019/083533

§ 371 (c)(1),
(2) Date: May 26, 2021

(87) PCT Pub. No.: WO2020/115064

PCT Pub. Date: Jun. 11, 2020

(65) Prior Publication Data

US 2022/0024714 A1 Jan. 27, 2022

(30) Foreign Application Priority Data

Dec. 4, 2018 (FR) ...................................... 1872287

(51) Int. Cl.
*B65H 75/44* (2006.01)
*B21F 3/00* (2006.01)
(Continued)

(52) U.S. Cl.
CPC ........... *B65H 75/4452* (2013.01); *B21F 3/00* (2013.01); *B65H 54/00* (2013.01); *B65H 54/205* (2013.01);
(Continued)

(58) Field of Classification Search
CPC ............ B65H 75/4452; B65H 75/4449; B65H 2701/32; B65H 2701/34; B65H 54/00;
(Continued)

(56) References Cited

U.S. PATENT DOCUMENTS 3,061,234 A * 10/1962 Morey ............... B65H 75/4449 242/378.2
3,120,355 A * 2/1964 Bowman ............ B65H 75/4452 242/365.2
(Continued)

FOREIGN PATENT DOCUMENTS

DE 874 021 C 4/1953
DE 202016102087 U1 * 7/2017 ......... B65H 75/4449
(Continued)

*Primary Examiner* — S. Joseph Morano
*Assistant Examiner* — James William Jones
(74) *Attorney, Agent, or Firm* — BakerHostetler

(57) ABSTRACT

A transfer device for limiting a twisting of a link between an end of the fixed link with respect to a fixed part and an end of the fixed link with respect to a revolving part that can revolve with respect to the fixed part about an axis of rotation, the transfer device for a link includes a composite drum comprising a set of drums aligned on the axis of rotation about which the link can be wound, the set of drums comprising a fixed drum intended to be secured to the fixed part in rotation about the axis of rotation, a revolving drum intended to be able to revolve about the axis x with respect to the fixed part and a set of at least one loose drum interposed between the fixed drum and the revolving drum, each loose drum being free to rotate about the axis of rotation with respect to the revolving drum and the fixed drum and having a height on the axis.

11 Claims, 4 Drawing Sheets

(51) Int. Cl.

| | |
|---|---|
| ***B65H 54/00*** | (2006.01) |
| ***B65H 54/20*** | (2006.01) |
| ***H01B 11/02*** | (2006.01) |
| ***H01B 11/22*** | (2006.01) |
| *B65H 54/28* | (2006.01) |
| *B65H 54/48* | (2006.01) |
| *B66D 1/00* | (2006.01) |
| *B66D 1/16* | (2006.01) |
| *B66D 1/26* | (2006.01) |
| *B66D 1/36* | (2006.01) |
| *B66D 1/38* | (2006.01) |
| *B66D 1/39* | (2006.01) |
| *B66D 1/74* | (2006.01) |

(52) U.S. Cl.

CPC ......... *B65H 75/4449* (2013.01); *H01B 11/02* (2013.01); *H01B 11/22* (2013.01); *B65H 54/2836* (2013.01); *B65H 54/485* (2013.01); *B65H 2701/32* (2013.01); *B65H 2701/34* (2013.01); *B66D 1/00* (2013.01); *B66D 1/16* (2013.01); *B66D 1/26* (2013.01); *B66D 1/36* (2013.01); *B66D 1/38* (2013.01); *B66D 1/39* (2013.01); *B66D 1/7415* (2013.01)

(58) Field of Classification Search

CPC B65H 54/205; B65H 54/2836; B65H 54/485; H01B 11/02; H01B 11/22; B21F 3/00; B66D 1/00; B66D 1/16; B66D 1/26; B66D 1/36; B66D 1/38; B66D 1/39; B66D 1/7415

USPC .......... 191/12.2 R; 385/135; 242/430, 474.8, 242/615, 118.41

See application file for complete search history.

(56) References Cited

U.S. PATENT DOCUMENTS

| | | | | |
|---|---|---|---|---|
| 3,539,123 A | | 11/1970 | Shutt | |
| 3,822,834 A | | 7/1974 | Fjarlie | |
| 4,065,066 A | * | 12/1977 | Swett ........................ | A61B 6/56 242/388.6 |
| 4,379,615 A | * | 4/1983 | Toda ...................... | H02G 11/02 242/388.6 |
| 4,565,333 A | * | 1/1986 | Meneian ............ | B65H 75/4452 242/365.2 |
| 10,294,066 B1 | * | 5/2019 | Bigbee, Jr. ......... | B65H 75/2263 |
| 2005/0247919 A1 | * | 11/2005 | Hoffend ................... | B66D 5/22 254/347 |

FOREIGN PATENT DOCUMENTS

| | | |
|---|---|---|
| DE | 10 2017 208 044 A1 | 11/2018 |
| FR | 1 345 038 A | 12/1963 |
| JP | 6282929 B2 | 2/2018 |

* cited by examiner

TRANSFER DEVICE FOR MAINTAINING AN ELECTRICAL OR OPTICAL CONNECTION

CROSS-REFERENCE TO RELATED APPLICATIONS

This application is a National Stage of International patent application PCT/EP2019/083533, filed on Dec. 3, 2019, which claims priority to foreign French patent application No. FR 1872287, filed on Dec. 4, 2018, the disclosures of which are incorporated by reference in their entirety.

FIELD OF THE INVENTION

The invention relates to the transfer devices that are intended to ensure the maintaining of an electrical and/or optical connection between a fixed part of a link, such as a cable, and a revolving part of the link, the revolving part being able to revolve with respect to the fixed part about an axis of rotation x.

BACKGROUND

This type transfer device is, for example, used in the field of winches used to deploy acoustic emission or reception antennas into the water via electrical/carrier cables. These cables are composed of an armoring, which can be metallic or fabric, and a core composed of electrical and/or optical conductive fibers. The function of the core is to transmit the information and/or the electrical power between a frame of the winch and an antenna intended to be wound around a drum of the winch mounted to pivot with respect to the frame. In order to transmit the information and/or the electrical power to the antenna via the cable, it is necessary to fix a part of the cable to the frame and to fix another part of the cable to the drum and ensure the mechanical and/or electrical and/or optical connection between these two parts during the rotation of the drum with respect to the frame.

A first solution is to ensure this connection only when the drum is fixed with respect to the frame, once the antenna is positioned at a desired distance in the water. This solution requires manual operations that are potentially dangerous on each movement of the drum.

A second solution is to use an electrical and/or optical revolving joint to permanently maintain an electrical and/or optical link between the part of the cable fixed to the frame and the other part fixed to the drum. The revolving joint incorporates optical tracks and/or electrical tracks that allow the optical and/or electrical continuity to be assured. Electrical tracks that are continuous over 360° can be provided on the frame and coupled to a brush on the revolving part. The drawback with this solution, in particular for the optical versions, is primarily its cost. In fact, the cost of a optical track is very high and has to be multiplied by the number of optical fibers to be connected.

A third solution consists in providing an intermediate part of the very long cable. The intermediate part of the cable extends between a part of the cable secured to the fixed part and a part of the cable secured to the revolving part in rotation about the axis x. The intermediate part of the cable is possibly relieved of its armoring to reduce its bulk. A winding-based transfer device allows the intermediate part of the cable to be wound to limit the twisting of the cable and ensure the electrical and/or optical link between the fixed part of the cable and the part of the cable fixed to the drum.

A solution of this type is disclosed in the document U.S. Pat. No. 3,539,123. This solution comprises two drums aligned on the axis of rotation of the drum of the winch, including one drum fixed with respect to the frame and one drum fixed with respect to the drum of the winch in rotation about the axis of rotation of the drum of the winch. The intermediated part of the cable, situated between the drum of the winch and the frame, is partly wound on the revolving drum and on the fixed drum. When the drum of the winch revolves in one direction, the revolving drum revolves with this drum and the intermediated part of the cable is unwound from the revolving drum and wound around the fixed drum. When the drum of the winch revolves in the other direction, the intermediate part of the cable is unwound from the fixed drum and wound onto the revolving drum.

This solution presents the drawback of being potentially very bulky. The bulk of the cable transfer device is given primarily by the dimensions of the drums required for the storage of the cable. The bulk of the drums is proportional to the dimensions of the intermediate part of the cable and to the maximum number of turns that the revolving drum must make in its use. This maximum number of turns corresponds to the finite number of turns that the drum of the winch is required to make. The intermediate part of the cable needs to be able to be completely transferred from the fixed drum to the revolving drum and vice versa. The greater the number of turns, the more each of the two drums (fixed and mobile) has to be enlarged (on the axis of rotation) for each to be able to store all of the intermediate part of the cable which can make the transfer device very bulky.

The document U.S. Pat. No. 3,539,123 proposes a solution of reduced bulk consisting in providing a revolving drum and a fixed drum that are coaxial, the fixed drum surrounding the revolving drum and the winding around the fixed drum being performed on the surface of the fixed drum which faces the revolving drum. However, this solution is less robust because the cable cannot be tensioned and can vibrate. Moreover, it has to be sufficiently rigid with respect to its weight to be able to be wound around the fixed drum without dropping.

The document FR2188593 proposes a solution in which it is possible to wind the cable around the revolving drum and the fixed drum on several layers. The major drawback with this solution is that the tension force supplied to the cable is variable because of the variation of the diameter of the winding when the layers build up which leads to a variation of the tension force for one and the same torque. Furthermore, it is necessary, either to provide drums of large diameter and therefore of small width to avoid an incorrect winding of the cable, or to provide an additional device to axially displace the pulley in order to correctly stow the cable.

SUMMARY OF THE INVENTION

One aim of the invention is to limit at least one of the abovementioned drawbacks.

To this end, the subject of the invention is a transfer device for limiting a twisting of a set of at least one link between an end of the link, fixed with respect to a fixed part and an end of the link, fixed with respect to a revolving part that can revolve with respect to the fixed part about an axis of rotation, the transfer device comprising:

- a composite drum comprising a set of drums aligned on the axis of rotation about which the link can be wound, the set of drums comprising a fixed drum intended to be secured to the fixed part in rotation about the axis of rotation x, a revolving drum intended to be able to revolve about the axis x with respect to the fixed part and a set of at least one loose drum interposed between the fixed drum and the revolving drum, each loose drum being free to rotate about the axis of rotation x with respect to the revolving drum and to the fixed drum and having a height on the axis x, transfer means comprising at least one transfer assembly, each transfer assembly being configured to transfer a link of the set of at least one link, when it is wound around the composite drum, between the fixed drum and the revolving drum, to the revolving drum when the revolving drum revolves in a first direction about the axis of rotation, and in reverse when the revolving drum revolves in the reverse direction.

Advantageously, the transfer means are configured so as to allow all of a useful winding to be transmitted from the set of at least one link produced continuously around the fixed drum and each loose drum, to the revolving drum so that the useful winding is produced around the fixed drum and each loose drum continuously, when the revolving drum revolves in the first direction, and in reverse when the revolving drum revolves in the reverse direction.

Advantageously, each transfer assembly is configured to allow a link of the set of at least one link to be transferred from a first point to a second point that are separated, along the axis of rotation, by a predetermined first distance D, greater than the height h of each loose drum.

Advantageously, at least one transfer assembly comprises a set of at least one return pulley intended to receive a transfer loop of a link of the set of at least one link extending between the fixed drum and the revolving drum when the link is wound around the composite drum to tend to transfer the link between the fixed drum and the revolving drum.

Advantageously, the return pulley has a median radial plane substantially parallel to the axis x so as to transfer from a first point to a second point that are separated, along the axis of rotation x, by a predetermined first distance D, greater than the height h of each loose drum, the first distance D being substantially the diameter of the pulley.

At least one set of at least one return pulley can comprise several return pulleys or a single return pulley.

Advantageously, the transfer assembly comprises:

a support supporting the set of at least one pulley, a revolving guide secured to the support in rotation about the axis of rotation x, the support being mounted to slide with respect to the composite drum on an axis substantially parallel to the axis x, the support being free in translation along the revolving guide with respect to the composite drum, the revolving guide being coupled to the revolving drum so as to revolve with respect to the revolving drum about the axis of rotation at a defined angular speed so that, when the link is wound around the composite drum and the loop is received by the set of at least one pulley, the link is transferred, between the fixed drum and the revolving drum, to the revolving drum when the revolving drum revolves in a first direction about the axis of rotation, and in reverse when the revolving drum revolves in the reverse direction.

Advantageously, the transfer device comprises coupling means coupling the revolving guide to the revolving drum in rotation about the axis x.

Advantageously, the coupling means comprise a link tension device making it possible to ensure that the link is kept taut.

In a particular embodiment, the transfer means comprise several transfer assemblies.

Advantageously, the transfer device comprises the set of at least one link, each link of the set of at least one link being wound around the composite drum.

Advantageously, the transfer device the set of at least one link forms a winding around the composite drum, the winding having a height greater than a height of the fixed drum and greater than a height of the revolving drum so that at least one loose drum receives a part of the winding of the link.

The invention relates also to a rotary device comprising the transfer device according to the invention, the rotary device comprising the fixed part and the revolving part, the fixed part being secured to the fixed drum in rotation about the axis x and the revolving part being secured to the revolving drum in rotation about the axis x.

BRIEF DESCRIPTION OF THE DRAWINGS

Other features, details and advantages of the invention will emerge on reading the description given with reference to the attached drawings given by way of example and which represent, respectively.

From one figure to another, the same elements are identified by the same references.

DETAILED DESCRIPTION

Figure 1:
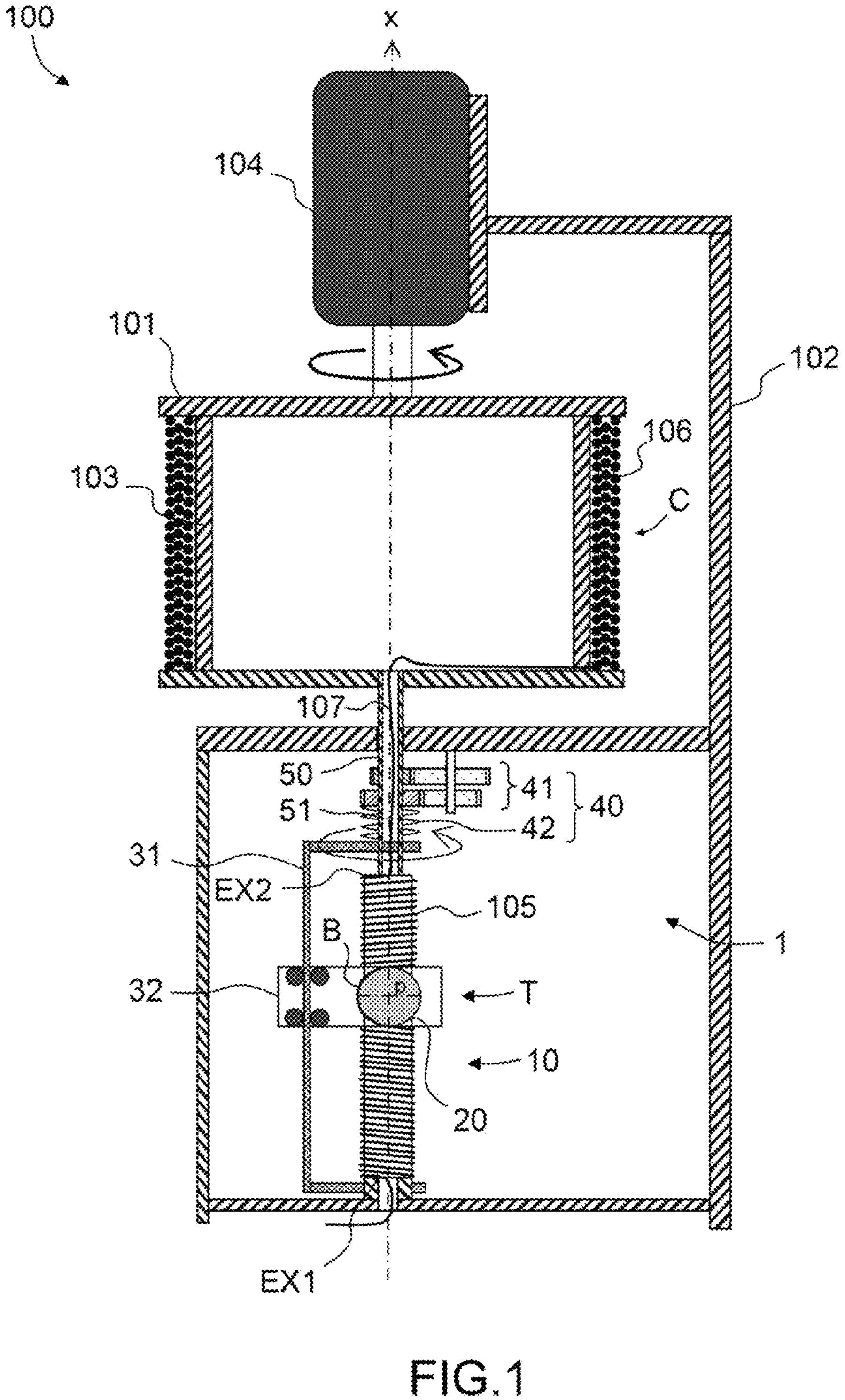
FIG. 1 schematically represents a rotary device comprising a transfer device according to an example of a first embodiment of the invention. For greater clarity, the first part and the second part of the rotary device, a shaft and the coupling means are represented in cross-section on a plane containing the axis of rotation, the rest of the transfer device is represented in perspective.

The transfer device according to the invention is intended to be incorporated in a rotary device, such as a winch 100 represented in FIG. 1, comprising a revolving part 101, for example a reel, capable of revolving with respect to a fixed part 102, for example the frame of the winch, about the axis of rotation.

The transfer device according to the invention is intended to make a flexible link 105 switch from the fixed part 102 to the revolving part 101 by limiting a twisting of the link when the revolving part revolves with respect to the fixed part about the axis x.

The link 105 comprises a first end EX1 secured to the fixed part 102.

The transfer device is intended to limit a twisting of the link between the first end EX1 of the link 105, fixed with respect to a fixed part 102 of the rotary device, and a second end EX2 of the link 105, fixed with respect to a revolving part 103 of the rotary device.

The link 105 is, for example, a part 105 of a cable C situated the extension of another part 106, of the cable C, intended to be wound around a drum 103 of the winch 100. This drum 103 is the drum of the reel 101. The link 105 comprises an end EX2 secured to the drum 103 in rotation about the axis x.

The winch 100 comprises an actuator 104 allowing the revolving part 103, here the drum of the winch, to be driven in rotation about the axis of rotation x with respect to the fixed part 102 so that the cable C, more specifically the part 106 of the cable C, is wound around the drum of the winch 103, when the drum 103 revolves in a first direction and is unwound when the drum 103 revolves in the other direction.

The link 105 is, for example, a mechanical, electrical and/or optical cable allowing transmission of optical information and/or of electrical information and/or of electrical power to ensure an electrical power supply. Generally, a cable can comprise a set of several fibers, possibly surrounded by a sheath. The link can comprises all the fibers or just some of the fibers and comprise the sheath or not have a sheath. The link can, for example, be a stripped part of the link 105 for reasons of bulk, it can comprise only the electrical and/or optical cable or cables of the cable C.

Figure 2:
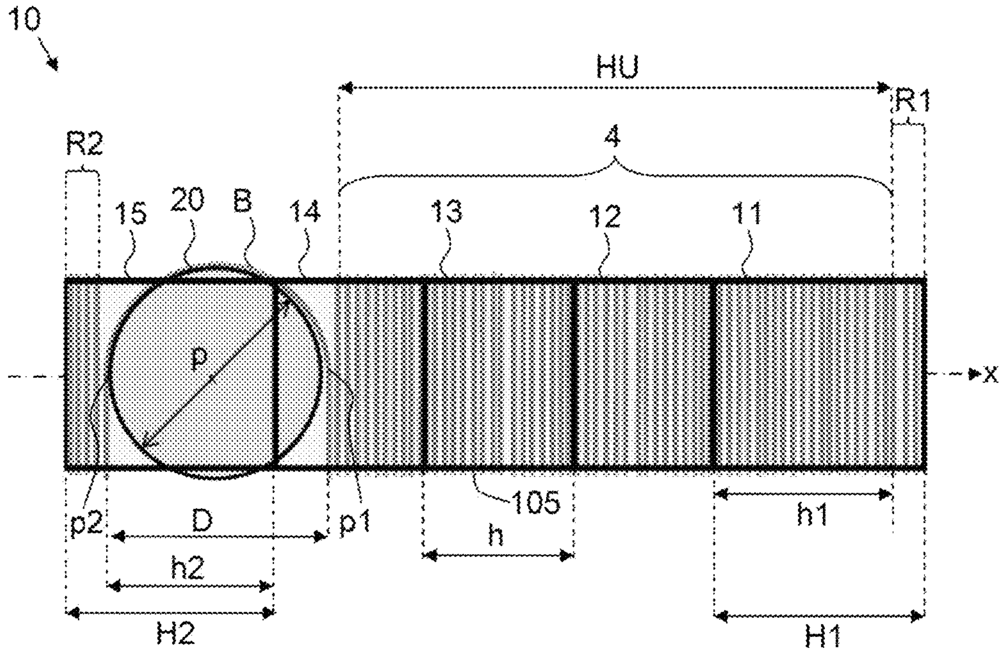
FIG. 2 schematically represents the composite drum, the pulley and a link which has to be transferred by the transfer device, when the useful winding is wound around the loose drums and the fixed drum, FIG. 3 schematically represents the composite drum, the pulley and a link that has to be transferred by the transfer device, when the link being partly transferred to the revolving drum with respect to FIG. 2, FIG. 4 schematically represents the composite drum, the pulley and a link which has to be transferred by the transfer device, when the useful winding has been totally transferred around the revolving drum and the loose drums with respect to FIG. 2, FIG. 5 schematically represents a variant in which the transfer assembly comprises two pulleys, only two loose drums of the composite drum are represented in this figure and the pulleys situated in front of the composite drum are represented transparently for the composite drums situated behind these pulleys to be visible, FIG. 6 schematically represents an example of another embodiment in which the transfer means comprise two transfer assemblies.
Figure 3:
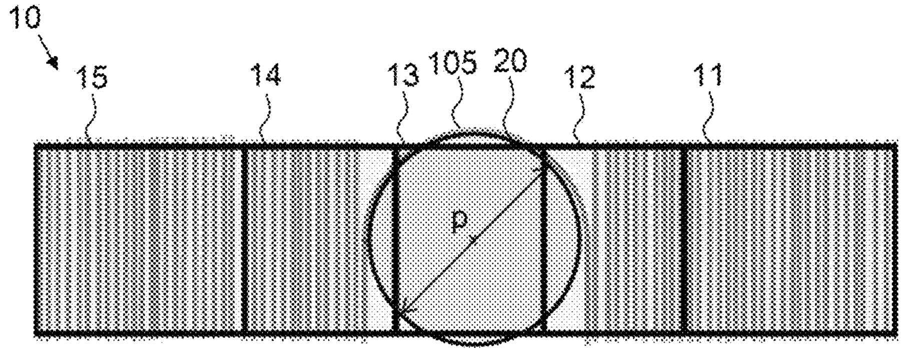
Figure 4:
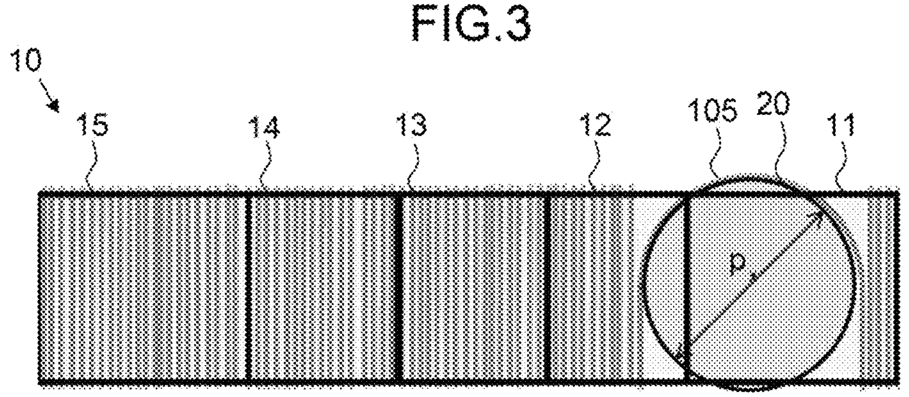

As can be seen in FIG. 1, the transfer device 1 comprises a composite drum 10 represented more specifically in FIGS. 2 to 4. The composite drum 10 comprises a set of drums 11, 12, 13, 14, 15, around which the link 105 can be wound.

The drums 11, 12, 13, 14 and 15 of the set 10 are aligned along the axis x. In other words, these drums are substantially cylinders of revolution about the axis x. In other words, the drums 11, 12, 13, 14 and 15 of the set 10 are coaxial.

The drums 11, 12, 13, 14 and 15 of the set 10 advantageously all have the same diameter but can, as a variant, have different diameters.

The composite drum 10 comprises a fixed drum 11 that is fixed with respect to the frame 102. The composite drum 10 also comprises a revolving drum 15 mounted to pivot about the axis x with respect to the frame 102. The revolving drum 15 is secured to the drum of the winch 103, and more particularly the revolving part, in rotation about the axis x.

The drums 11, 12, 13, 14 and 15 of the set 10 are adjacent along the axis x.

The drums are, advantageously, disposed substantially contiguously allowing for operating clearance.

The transfer device 1 comprises transfer means comprising a transfer assembly T, comprising the pulley 20 in the example of FIGS. 2 to 4, configured to transfer the link 105, when it is wound around the composite drum, between the fixed drum 11 and the revolving drum 15, so the revolving drum 15 when the revolving drum 15 revolves in a first direction about the axis of rotation x, and in reverse when the revolving drum 15 revolves in the reverse direction.

In other words, the transfer assembly T is configured to pay out the link 105 from a first point p1 to wind it at a second point p2 closer to the revolving drum 15 than the first point p1 when the drum revolves in a first direction and closer to the fixed drum than the first point p1, when the revolving drum revolves in the reverse direction. The points p1 and p2 are points tangential to the drum, where the link 105 leaves and, respectively, arrives on the composite drum 10.

In other words, the transfer assembly tends to pay out the link on the fixed drum 11 side to wind it on the revolving drum 15 side when the revolving drum 15 revolves in the first direction, and in reverse when the revolving drum 15 revolves in the reverse direction.

The transfer is performed via the assembly of at least one loose drum.

In the nonlimiting embodiment of FIGS. 1 to 4, the transfer assembly T comprises a return pulley 20 intended to receive, in its groove, when the link 105 is wound around the composite drum 10, a transfer loop B of the link 105 to ensure the return of the link from the first point p1 to the second point p2.

The axis p of the pulley 20 is at right angles to the median radial plane of the pulley. The pulley 20 is intended to pivot about the axis of the pulley p. It is free to rotate about the axis of the pulley p. The pulley 20 can circulate radially around the drum and be displaced along the axis x so as to allow a winding of the link to be passed from the fixed drum 11 to the revolving drum 15 when the revolving drum 15 revolves in one direction, and in reverse when the revolving drum 15 revolves in the reverse direction.

The return pulley 20 advantageously has a median radial plane substantially parallel to the axis x and remote from the axis x so as to tend to transfer the link 105 from the first point p1 to a second point p2. These two points p1 and p2 are then separated, along the axis of rotation x, by a distance equal to the diameter D of the pulley 20.

According to the invention, the set of drums comprises a set of at least one loose drum 12, 13, 14 disposed between the fixed drum 11 and the revolving drum 15 on the axis x. In the nonlimiting example of the figures, the composite drum 10 comprises a first loose drum 12, a second loose drum 13 and a third loose drum 14. As a variant, the set of at least one loose drum 12, 13, 14 comprises a single loose drum or a different number of loose drums.

Each loose drum 12, 13, 14 of the set of at least one loose drum is free to rotate about an the axis of rotation x with respect to the fixed drum 11 and with respect to the revolving drum 15. When the set of at least one loose drum comprises several loose drums as in the example of the FIGS. 1 to 4, the loose drums are free to rotate about the axis of rotation x with respect to one another.

The loose drums are, for example, mounted ball bearings on a shaft 50, secured to the frame 2 in rotation about the axis x, on which the revolving drum 15 is mounted to pivot about the axis x.

The invention therefore gives the possibility of configuring the transfer assembly T so as to allow all of a useful winding U of the link 105 produced continuously around the fixed drum 11 and the loose drums 12, 13, 14 as represented in FIG. 2, to be transferred to the revolving drum 15 so that the useful winding U of the link 105 is produced continuously around the loose drums 12, 13, 14 and the revolving drum 15, as represented in FIG. 4, when the revolving drum 15 revolves in the first direction, and the reverse when the revolving drum 15 revolves in the reverse direction.

For a useful winding U of the link 105 of predetermined height HU on the axis x corresponding to a particular number of turns and diameter, the proposed solution makes it possible to provide a revolving drum 15 and a fixed drum 11 that each have, on the axis x, a useful height h1, h2 less than the height HU. At least one loose drum then receives a part of the useful winding of the link. In other words, the proposed solution makes it possible to provide a revolving drum 15 and a fixed drum 11 that each have, on the axis x, a useful height H1, H2 less than the height HU such that at least one loose drum receives a part of the winding.

The useful height HT of the composite drum 10 allowing all of the useful winding to be transmitted on the fixed drum side or on the revolving drum side 15 can be equal to:

$$HT=HU+D$$

With HU=d*N, d being the diameter of the link 105, N being the number of turns of the useful winding and D is the distance between the points p1 and p2 on the axis x.

The proposed solution makes it possible, for a given finite number of revolutions of the drum of the winch 103 about the axis x and a link 105 of predetermined diameter and length, to reduce the bulk of the storage zone of the link on the axis x with respect to a solution comprising only a fixed drum and a revolving drum that are adjacent on the axis x, in which it is necessary for each of the drums to be able to store all of the useful winding of the link. That allows the link transfer device to be made compatible with smaller allotted footprints, and therefore the cost of the system to be very significantly reduced, in the case of the need for a continuous optical connection comprising a large number of optical fibers.

The proposed solution also makes it possible, for one and the same number of revolutions of the revolving drum 15, a link of predetermined diameter and a predetermined allotted useful height, to store a link length greater than a solution comprising only a fixed drum and a revolving drum aligned along the axis x. In other words, the composite drum allows a greater number of turns of the link to be stored.

It should be noted that the total winding of the link 105 comprises, in addition to the useful winding U of the link, a first residual winding R1 of a few turns made around the fixed drum 11 and the second residual winding R2 of a few turns made around the revolving drum 15. These residual windings R1 and R2 are present in the two states of FIGS. 2 and 4 and occupy the same positions on the axis x in both these states. The first residual winding R1 allows a first end EX1 of the link 105 to be secured to the fixed drum 11 and the other residual winding allows a second end EX2 of the link 105 to be secured to the revolving drum 15. The overall height of the composite drum is equal to the sum of the useful height HU, of the distance D and of the heights of the two residual windings.

Each loose drum 12, 13, 14 has a height h on the axis of rotation x. In the embodiment of the figures, the loose drums 12, 13, 14 all have the same height that they can, as a variant, have different heights along the axis x.

Advantageously, to allow this transfer without blockage, the transfer assembly is configured to transfer the link 105 from a first point p1 to a second point p2 that are separated, along the axis x, by a first predetermined distance D, greater than the height h of each loose drum 12, 13, 14 along the axis x. Thus, the diameter D of the pulley 20 of FIG. 2 is advantageously greater than the height h of each loose drum. Consequently, when the point p1 is opposite a loose drum, the point p2 is necessarily opposite another drum of the composite drum which allows it to ensure the transfer of the link from the loose drum to the other drum by avoiding a situation in which the transfer assembly would tend to pay out the link from a loose drum and wind it onto the same loose drum.

The first distance D is greater than or equal to the minimum winding radius of the link 105.

FIGS. 2 to 4 are described more specifically hereinbelow. In these figures, the pulley, situated in front of the composite drum 10 is represented transparently for the drums situated behind it to be visible.

In the first state represented in FIG. 2, the revolving drum 15 is in a first angular position about the axis x with respect to the frame 102, in which the fixed drum 11 and each of the loose drums 12, 13, 14 receive all of the useful winding U of the link 105 which extends continually from the drum 11 to the drum 14 adjacent to the revolving drum 15 on the axis x. That way, the loose drums 12, 13, 14 are coupled, in rotation about the axis x, to the fixed drum 11 by the link 105. This coupling is obtained by friction. The link 105 extends from the loose drum 14 adjacent to the revolving drum 15 to the revolving drum 15 by passing through the transfer loop B (that is to say by the pulley) so that the loose drums 12 to 14 are uncoupled from the revolving drum 15 in rotation about the axis x. In other words, the continuous useful winding U is separated from the residual winding R2 wound around the revolving drum 15 by the transfer loop B. That makes it possible to avoid a coupling of the loose drums with the revolving drum 15 in rotation about the axis x which would be incompatible with their coupling in rotation with the fixed drum 11.

It should be noted that the turns of each continuous winding are produced in the same direction about the axis x. Moreover, two windings linked by the transfer loop B are produced in reverse directions about the axis x.

To switch from the first state to the second state, the revolving drum 15 has revolved about the axis x with respect to the frame 102.

In the second state represented in FIG. 4, the revolving drum 15 is in a second angular position about the axis x with respect to the frame 102, in which the revolving drum and each of the loose drums 12, 13, 14 receive all of the useful winding E of the link 105 which extends continuously from the revolving drum 15 to the drum 12 adjacent to the fixed drum 11 on the axis x. That way, the loose drums 12, 13, 14 are coupled, in rotation about the axis x, to the revolving drum 15 by the link 105. The link 105 extends from the loose drum 12 adjacent to the fixed drum 11 to the fixed drum 11 by passing through the transfer loop B. In other words, the continuous useful winding U is separated from the residual winding R1 wound around the fixed drum 11 by the transfer loop B. That makes it possible to avoid a coupling of the loose drums with the fixed drum 11 in rotation about the axis x which would be incompatible with their coupling in rotation with the revolving drum 15.

Thus, in the embodiment of the figures, the loose drums 12, 13, 14 are alternately coupled, in rotation about the axis x, to the fixed drum 11 and to the revolving drum 15 via the link 105. They are used in the first state of FIG. 2 to increase the storage capacities of the fixed drum 11 and in the second state of FIG. 4 to increase those of the revolving drum 15.

Generally, each loose drum is intended to be coupled in rotation about the axis x with another drum with which the two drums share the storage of a continuous portion of the winding of the link 105. The continuous portion of the winding is wound around the loose drum and the other drum and extends continuously from the loose drum to the other drum. In other words, a loose drum is coupled in rotation about the axis x with another drum situated on the same side of the transfer loop B.

When the revolving drum 15 revolves about the axis x from its position of FIG. 2 to its position of FIG. 4, the link 105 is unwound successively from the successive loose drums 14, 13, 12 on the axis x to be wound around the revolving drum 15, then successively onto the successive loose drums 14, 13 then 12 as can be seen in FIGS. 2 to 4.

Since the pulley 20 has a diameter greater than the width of each of the loose drums 12, 13, 14, this operation does not cause any blockage. In fact, when the pulley is opposite one of the loose drums, it is necessarily opposite at least two drums. Thus, the link 105 is entirely unwound or paid out from one of the loose drums, such as, for example, the loose drum 13 in FIG. 3 which therefore once again becomes free in rotation about the axis x with respect to the fixed drum and the revolving drum 15, before reverting to being wound onto this loose drum 13 once the link 105 is wound continuously over all the height of the revolving drum 15 and each loose drum 14 separating the loose drum 13 from the revolving drum 15, as can be seen in FIG. 4. The loose drum 13 is then coupled to the revolving drum 15 *i* rotation about the axis x under the effect of the winding of the link 105 around the loose drum 13.

In the embodiment of FIGS. 1 to 4, the set of at least one pulley comprises a single return pulley 20. As a variant, this set comprises several pulleys. Each pulley can circulate radially around the drum and be displaced along the axis x so as to allow a winding of the link to be transferred from the fixed drum to the revolving drum when the revolving drum revolves in one direction and in reverse.

Advantageously, each return pulley has a median radial plane parallel to the axis x, that is to say a pulley axis at right angles to the axis x.

Figure 5:
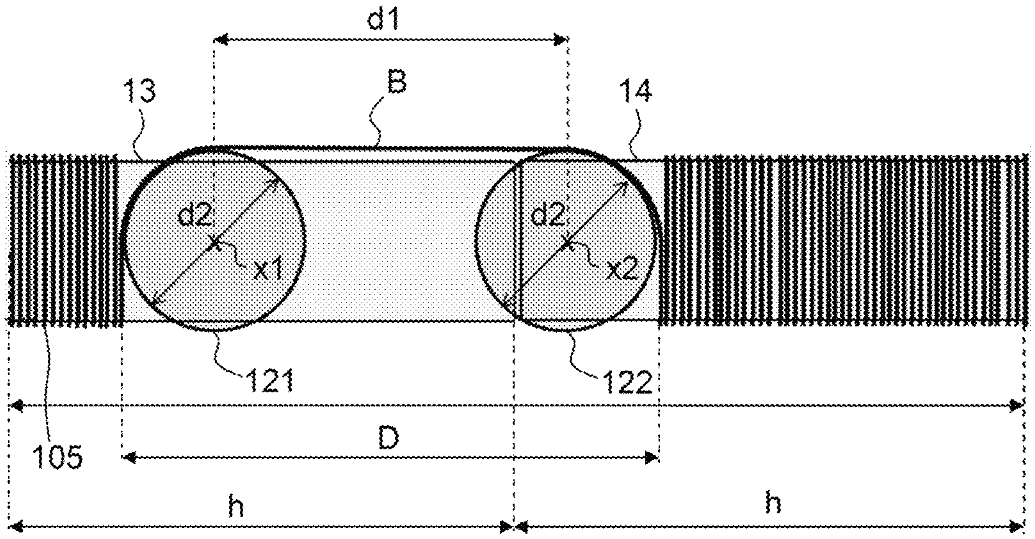

Thus, it is for example possible to provide, as represented in FIG. 5, two pulleys 121, 122 of the same diameter of median radial planes substantially parallel to the axis x and each having a pulley axis x1, x2, the axes of the pulleys 121, 122 being aligned on an axis parallel to the axis x. The distance D between the points p1 and p2 is given by:

$$D=d1+d2$$

In which d1 is the center distance between the pulleys and d2 is the diameter of the pulleys.

It is the sum of d1 and d2 which has to be greater than the height h of each of the loose drums.

This example allows the bulk of the transfer device to be limited by using two pulleys of small diameter instead of one bulky pulley of large diameter, when the height of the loose cable drum or drums is significant.

It should be noted that, in the examples of the figures, the pulleys are disposed so that their median radial planes are substantially parallel to the axis x and their axes cross the axis x.

As a variant, the axes of the pulleys can be offset from the axis x and/or be disposed with median radial planes having a different orientation with respect to the axis x.

In the case of several pulleys, the pulleys can have different diameters and be arranged differently. The important thing is for them to be configured and arranged to tend to transfer the link 105 from a first point p1 to a second point p2.

The transfer assembly advantageously comprises, in addition to the set of at least one pulley 20:

- a support 32 supporting the set of at least one pulley 20 so that a pulley access p of each pulley 20 of the set is secured to the support 32,
- a revolving guide 31 secured to the support 32 in rotation about the axis of rotation x, the support being mounted to slide with respect to the composite drum about an axis substantially parallel to the axis x, the support 32 being free in translation along the revolving guide 31 with respect to the composite drum 10 or the frame 102.

The pulley 20 is, for example, mounted loose about its axis p on an arm 32 sliding with respect to the revolving guide 31 on an axis parallel to the axis x.

The revolving guide 31 is coupled to the revolving drum 15 so as to revolve with respect to the revolving drum 15 about the axis of rotation x at a defined angular speed so that, when the link 105 is wound around the composite drum 10 and the transfer loop B is received by the set of at least one pulley 20, then the link is transferred, between the fixed drum 11 and the revolving drum 15, to the revolving drum 15, when the revolving drum 15 revolves in a first direction about the axis of rotation x, and the reverse when the revolving drum 15 revolves in the reverse direction about the axis of rotation x.

Advantageously, the link 105 is unwound from the first point p1 to be wound at a second point p2.

Each pulley 20 is free to rotate about its axis of rotation p.

In the example of FIGS. 1 to 4, since the support 32 is mounted to be free in translation on the revolving guide 31 with respect to the composite drum 10, when the pulley 20 receives the transfer loop B of the link 105, the pulley 20 is translated along the axis x under the effect of the paying out of the link 105 on one side of the pulley 20 and of the winding of the link 105 on the other side of the pulley 20.

The transfer assembly comprises coupling means 40 allowing the revolving guide 31 to be coupled to the revolving drum 15 in rotation about the axis x so that the revolving guide revolves about the axis x with respect to the frame in the same direction as the revolving drum 15 at a speed of rotation that is substantially equal to half that of the revolving drum 15 regardless of the direction of rotation of the pulley.

The coupling means 40 comprise, for example, a reducing gear 41.

Advantageously, the revolving guide 31 is coupled to the revolving drum 15 in about the axis x so as to revolve in the same direction as the revolving drum 15 about the axis x with respect to the frame substantially at half the speed of rotation of the revolving drum 15. The revolving guide is, for example, mounted on the shaft 50 by means of coupling means comprising a reducing gear of ratio 1/2.

Advantageously, the coupling means 40 comprise a link tensioning device 42 allowing the link 105 to be kept taut.

This link tensioning device 42 is arranged and configured to exert a torsional torque on each return pulley so that when the link travels in a given direction between the revolving drum and the fixed drum, it passes over the return pulley and forces it to travel radially by overcoming the taut exerted by the spring and so that, when the link travels in reverse direction, it is paid out from the feeding drum and stresses the return pulley to revolve in reverse direction under the effect of the elastic forces which are applied to it by the taking-up of the slack.

This link tensioning device comprises a torsion spring 42 linking the reducing gear to the revolving guide 31.

The transfer device comprises, for example, a shaft 50 on the axis x, secured to the drum 15 in rotation about the axis x.

Advantageously, the shaft 50 is hollow so that the part 106 of the cable C wound around the drum of the winch 103 is linked to the link 105 by an intermediate part 107 of the cable housed in the hollow 51 of the hollow shaft 50. That makes it possible to prevent having the cable pass through revolving elements at different speeds.

The example of the winch is not limiting, the transfer device for a cable according to the invention can be incorporated in any device comprising a fixed part and a part that revolves with respect to the fixed part to limit the twisting of the link linked on one side to the fixed part and on the other side to the revolving part. It is notably possible to envisage incorporating the transfer device in an articulation between two parts of an articulated arm.

The transfer device according to the invention is particularly suited to a link between a fixed part and a revolving part when the revolving part is able to make a finite number of revolutions between two end angular positions with respect to the fixed part.

The diameter of the drum is dictated by the mechanical characteristics of the cable. It is greater than or equal to the minimum diameter of the winding of the link 105.

The transfer means of the embodiments of FIGS. 1 to 4 comprise a single transfer assembly allowing a link to be transferred to the revolving drum 15 when the revolving drum revolves in one direction when the revolving drum revolves in the other direction. In another embodiment, the transfer device comprises several transfer assemblies as described previously allowing a set of links to be transferred to the revolving drum 15 when the revolving drum turns in one direction when the revolving drum turns in the other direction. Each transfer assembly makes it possible to ensure the transfer of one of the links (to the revolving drum 15 when it revolves in one direction and to the fixed drum 11 when the revolving drum 15 revolves in the reverse direction). That, for example, makes it possible to separate the transfer of an electrical cable and of an optical cable included in one and the same towing electrical cable C. It is thus possible to separate the connectors of these different cables and thus use inexpensive commercial connectors. This separation also allows links of smaller diameter to be transferred and thus the diameter of the composite drum to be limited.

Figure 7:
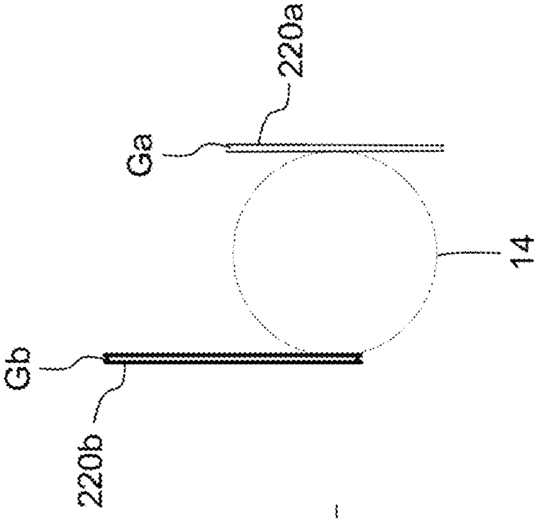
FIG. 7 schematically represents a cross section on the plane P of the embodiment of FIG. 6.
Figure 6:
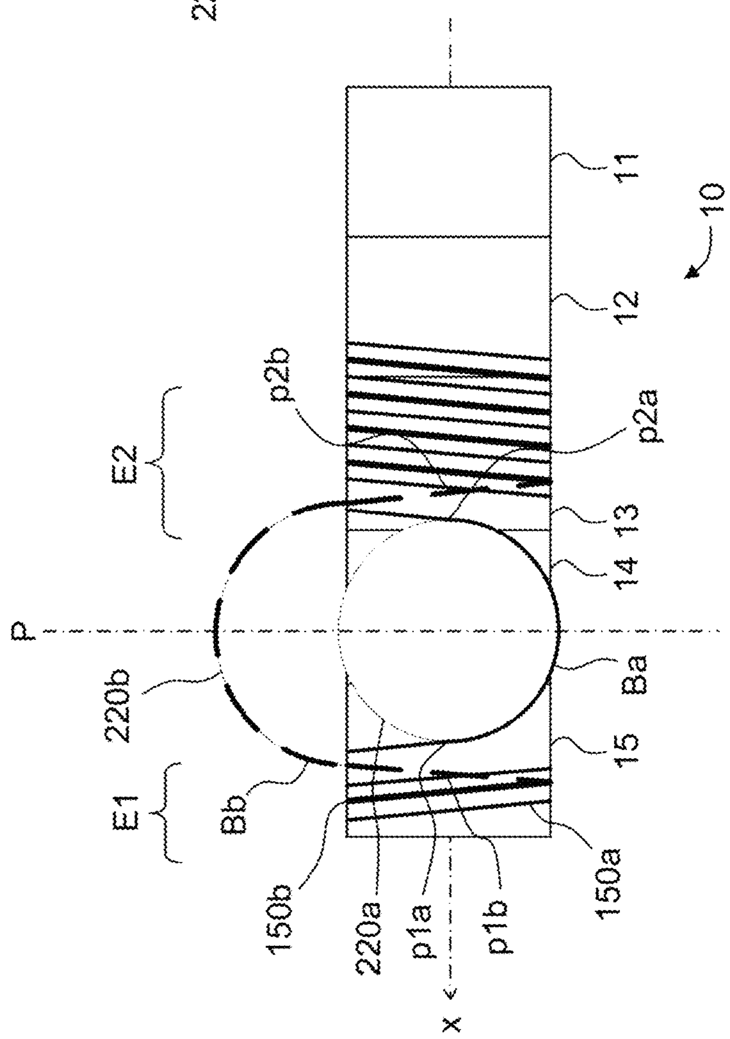

One example of this other embodiment is represented in FIGS. 6 and 7. FIG. 7 represents a cross-sectional view on the plane P, of the transfer device of FIG. 6. The links of FIG. 6 are not represented in FIG. 7 for greater clarity.

This embodiment differs from the embodiment of FIGS. 1 to 3 in that it comprises two transfer assemblies to ensure the transfer of two links 150*a*, 150*b*. Each transfer assembly comprises, in the nonlimiting example of FIGS. 6 and 7, a pulley 220*a*, 220*b*. Each return pulley 220*a*, 220*b* can receive a loop Ba, Bb of one of the links 150*a*, 150*b* in its groove Ga, Gb to ensure the transfer of the link 150*a*, 150*b*.

The first return pulley 220*a* allows the first link 150*a* to be paid out from a first point p1*a* to be wound at a second point p2*a* closer to the revolving drum 15 than the first point p1*a* when the drum revolves in one direction and closer to the fixed drum 11 than the first point p1*a* when the revolving drum 15 revolves in the reverse direction. The second return pulley 220*b* makes it possible to pay out the second link 150*b* from a first point p1*b* to be wound at a second point p2*b* closer to the revolving drum 15 than the first point p1*b* when the drum revolves in one direction and closer to the fixed drum 11 than the first point p1*b* when the revolving drum 15 revolves in the reverse direction.

The transfer assemblies are configured to transfer the cable in the same direction when the revolving drum revolves in one direction and to transfer the cable in the same reverse direction when the drum revolves in the reverse direction.

The pulleys are dimensioned and disposed so that the points pia and p2*a* are surrounded, axially, by the points p1*b* and p2*b* so that, when the transfer assemblies transfer the links 150*a*, 150*b* to one side of the composite drum 10 (when the revolving drum 15 revolves in one direction), there is formed, alternately, one turn of the first link 150*a* and one turn of the second link 150*b* on this side of the composite drum 10 on the axis x. The same applies when the transfer assemblies ensure that transfer of the links to the other side of the drum (that is to say when the revolving drum 15 revolves in the reverse direction). The winding that is thus formed comprises two individual windings E1 and E2 represented partially in FIG. 6, produced in reverse directions with respect to one another, and each comprising, alternately, one turn of the first link 150*a* and one turn of the second link 150*b*. In the nonlimiting example of FIGS. 6 and 7, the first return pulley 120*a* has a diameter smaller than that of the second return pulley 120*b*. Moreover, the pulleys are offset so as to ensure this function by allowing the turns of the first link 150*a* to be formed between the second pulley 120*b* and the drum 10.

In FIG. 6, the second pulley 120*b* is represented by dotted lines because it is on the other side of the drum 10 with respect to the first pulley 120*a*. The part of the second link 150*b* situated on the other side of the drum 10 with respect to the first pulley 120*a* is also represented by dotted lines.

Each transfer assembly can comprise its own support and its own guide. As a variant, transfer assemblies comprise a common support and/or a common guide.

In the embodiments of the figures, the winding comprises two individual windings situated on either side of the points p1 or pia and p2 or p2*a*. The turns of each individual winding are, preferably, contiguous to favor the correct winding of the links and the correct guidance of the support. In FIG. 1, the turns are represented as not contiguous for greater clarity.

The transfer assemblies can be configured, as in FIG. 5, so that each individual winding comprises only turns that are adjacent on the axis x. In other words, each individual winding comprises a single layer of turns.

In a variant embodiment, the transfer assemblies are configured so that, when the transfer assemblies transfer the links 150*a*, 150*b* to one side of the composite drum 10 (when the revolving drum 15 revolves in one direction), the turns of the first and second links are formed on two layers around the drum on this side of the composite drum 10 on the axis x. The same applies when the transfer assemblies ensure the transfer of the link to the other side of the drum (that is to say when the revolving drum 15 revolves in the reverse direction). The winding thus formed comprises two individual windings, produced in reverse directions with respect to one another, and each comprising an individual winding of the first link and an individual winding of the second link produced one on top of the other around the composite drum.

The invention claimed is:

1. A transfer device for limiting the twisting of a set of at least one link between a first end of the link, configured to be secured to a fixed part of a rotary device, and a second end of the link, configured to be secured to a revolving part of the rotary device, the revolving part being able to revolve with respect to the fixed part about an axis of rotation (x), the transfer device comprising:

a composite drum comprising a set of drums aligned on the axis of rotation (x) about which the link can be wound, the set of drums comprising a fixed drum intended to be secured to the fixed part in rotation about the axis of rotation x, a revolving drum intended to be able to revolve about the axis x with respect to the fixed part and a set of at least one loose drum interposed between the fixed drum and the revolving drum, each loose drum being free to rotate about the axis of rotation (x) with respect to the revolving drum and a fixed drum and having a height on the axis (x), transfer means comprising at least one transfer assembly, each transfer assembly being configured to transfer a link of the set of at least one link, when it is wound around the composite drum, between the fixed drum and the revolving drum, to the revolving drum when the revolving drum revolves in a first direction about the axis of rotation (x), and in reverse when the revolving drum revolves in the reverse direction, wherein the transfer means are configured so as to allow all of a useful winding (U) to be transmitted from the set of at least one link produced continuously around the fixed drum and each loose drum, to the revolving drum so that the useful winding (U) is produced around the fixed drum and each loose drum continuously, when the revolving drum revolves in the first direction, and in reverse when the revolving drum revolves in the reverse direction.

2. The transfer device as claimed in claim 1, wherein each transfer assembly is configured to allow a link of the set of at least one link to be transferred from a first point (p1) to a second point (p2) that are separated, along the axis of rotation (x), by a predetermined first distance D, greater than the height h of each loose drum.

3. The transfer device as claimed in claim 1, wherein at least one transfer assembly comprises a set of at least one return pully intended to receive a transfer loop (B) of a link of the set of at least one link extending between the fixed drum and the revolving drum when the link is wound around the composite drum to tend to transfer the link between the fixed drum and the revolving drum.

4. The transfer device as claimed in claim 3, wherein the return pulley has a median radial plane substantially parallel to the axis x so as to transfer the link from a first point to a second point that are separated, along the axis of rotation x, by a predetermined first distance D, greater than the height h of each loose drum, the first distance D being substantially the diameter of the pulley.

5. The transfer device as claimed in claim 3, wherein the transfer assembly comprises:

a support supporting the set of at least one pulley, a revolving guide secured to the support in rotation about the axis of rotation x, the support being mounted to slide with respect to the composite drum on an axis substantially parallel to the axis x, the support being free in translation along the revolving guide with respect to the composite drum, the revolving guide being coupled to the revolving drum so as to revolve with respect to the revolving drum about the axis of rotation (x) at a defined angular speed so that, when the link is wound around the composite drum and the loop is received by the set of at least one pulley, the link is transferred, between the fixed drum and the revolving drum, to the revolving drum when the revolving drum revolves in a first direction about the axis of rotation (x), and in reverse when the revolving drum revolves in the reverse direction.

6. The transfer device as claimed in claim 5, comprising coupling means coupling the revolving guide to the revolving drum in rotation about the axis x, the coupling means comprising a link tension device making it possible to ensure that the link is kept taut.

7. The transfer device as claimed in claim 1, wherein at least one set of at least one return pulley comprises several return pulleys.

8. The transfer device as claimed in claim 1, wherein the transfer means comprise several transfer assemblies.

9. The transfer device as claimed in claim 1, comprising the set of at least one link, each link of the set of at least one link being wound around the composite drum.

10. The transfer device as claimed in claim 9, wherein the set of at least one link forms a winding around the composite drum, the winding having a height greater than a height of the fixed drum and greater than a height of the revolving drum so that at least one loose drum receives a part of the winding of the link.

11. A rotary device comprising the transfer device as claimed in claim 1, the rotary device comprising the fixed part and the revolving part, the fixed part being secured to the fixed drum in rotation about the axis (x) and the revolving part being secured to the revolving drum in rotation about the axis (x).

* * * * *